(12) United States Patent
Fong

(10) Patent No.: US 10,427,653 B2
(45) Date of Patent: Oct. 1, 2019

(54) SYSTEM AND METHOD FOR LEVELING A TRAILER

(71) Applicant: General Electric Company, Schenectady, NY (US)

(72) Inventor: Raymond Ka Lok Fong, Houston, TX (US)

(73) Assignee: General Electric Corporation, Schenectady, NY (US)

( * ) Notice: Subject to any disclaimer, the term of this patent is extended or adjusted under 35 U.S.C. 154(b) by 197 days.

(21) Appl. No.: 15/389,306

(22) Filed: Dec. 22, 2016

(65) Prior Publication Data

US 2018/0178763 A1   Jun. 28, 2018

(51) Int. Cl.
*B60S 9/10* (2006.01)
*B60S 9/12* (2006.01)
*B60S 9/04* (2006.01)
*B23P 19/06* (2006.01)

(52) U.S. Cl.
CPC . *B60S 9/10* (2013.01); *B60S 9/04* (2013.01); *B60S 9/12* (2013.01); *B23P 19/066* (2013.01)

(58) Field of Classification Search
CPC ...... B60S 9/10; B60S 9/12; B60S 9/04; B23P 19/066
See application file for complete search history.

(56) References Cited

U.S. PATENT DOCUMENTS

| | | | |
|---|---|---|---|
| 3,227,294 A * | 1/1966 | Erlewine | B60P 1/6436 188/251 R |
| 6,250,650 B1 * | 6/2001 | Douglas | B60D 1/26 280/425.1 |
| 6,425,604 B1 | 7/2002 | Schubert et al. | |
| 6,641,161 B1 | 11/2003 | McLelland | |
| 8,051,545 B2 | 11/2011 | Peveler | |
| 2006/0082079 A1 | 4/2006 | Eichhorn et al. | |
| 2006/0226612 A1 | 10/2006 | Smith et al. | |
| 2016/0244268 A1 * | 8/2016 | Ritter | B65G 41/002 |
| 2016/0248230 A1 * | 8/2016 | Tawy | F01D 15/10 |
| 2018/0022325 A1 * | 1/2018 | Garceau | B60S 9/02 180/41 |

FOREIGN PATENT DOCUMENTS

EP        2184211        7/2014

* cited by examiner

*Primary Examiner* — Frederick M Brushaber
(74) *Attorney, Agent, or Firm* — Fletcher Yoder, P.C.

(57) ABSTRACT

A mobile power plant system includes a trailer having a first leg extending from the trailer and having a first gear assembly, a second leg extending from the trailer and having a second gear assembly, and one or more turbine components positioned on the trailer. The mobile power plant system also includes a leveling system having a first power tool coupled with the first gear assembly, a second power tool coupled with the second gear assembly, a first level sensor corresponding with the first power tool, a second level sensor corresponding with the second power tool, and a controller communicatively coupled with the first level sensor and the second level sensor. The controller receives data, from the first level sensor, indicative of a first attitude of the trailer proximate to the first leg. The controller receives data, from the second level sensor, indicative of a second attitude of the trailer proximate to the second leg. The controller monitors the first attitude and the second attitude, and adjusts a first force applied by the first power tool, a second force applied by the second power tool, or both based on the first attitude, the second attitude, or both.

20 Claims, 5 Drawing Sheets

US 10,427,653 B2

SYSTEM AND METHOD FOR LEVELING A TRAILER

BACKGROUND OF THE INVENTION

The subject matter disclosed herein relates to gas turbine systems and, more particularly, to systems and methods for on-site setup of mobile turbomachinery.

Typically, permanent power plants are built to provide power to customers connected to a power grid. However, there are a variety of reasons that the permanent power plant may not be able to meet the power demand of the customers. For example, in periods of intense growth, the demand by customers may increase to surpass the amount of power the permanent power plant can generate. Further, the permanent plant may be shut down or undergo equipment maintenance. Further, natural disasters such as hurricanes and earthquakes can disrupt power for a portion of the customers. Further still, certain areas simply may not include permanent power plants.

Mobile power plants may be transported to an environment such as those described above to meet power demands of customers. In some situations, mobile power plants may be delivered to a site in a partially assembled state of components, followed by on-site setup of those components. Depending on various external conditions, the transport and the on-site installation of the mobile power plants may take several days. Accordingly, it may be beneficial to provide systems and methods that ease of transportation and installation of the components of the mobile power plants, in order to reduce installation time. For example, trailers of the mobile power plant may facilitate transportation. However, in certain areas (e.g., countries, states, nations, jurisdictions), trailer on-axle weight requirements may limit the types of components available for use in the mobile power plant. Accordingly, it may be beneficial to provide systems and methods that improve the installation time of these components on-site, and that reduce the trailer on-axle weight of the mobile power plant system, in order to meet customer demands for power.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, mobile power plant system includes a trailer having a first leg extending from the trailer and having a first gear assembly, a second leg extending from the trailer and having a second gear assembly, and one or more turbine components positioned on the trailer. The mobile power plant system also includes a leveling system having a first power tool coupled with the first gear assembly, a second power tool coupled with the second gear assembly, a first level sensor corresponding with the first power tool, a second level sensor corresponding with the second power tool, and a controller communicatively coupled with the first level sensor and the second level sensor. The controller receives data, from the first level sensor, indicative of a first attitude of the trailer proximate to the first leg. The controller receives data, from the second level sensor, indicative of a second attitude of the trailer proximate to the second leg. The controller monitors the first attitude and the second attitude, and adjusts a first force applied by the first power tool, a second force applied by the second power tool, or both based on the first attitude, the second attitude, or both.

In a second embodiment, a leveling system of a mobile power plant trailer includes a first power tool configured to elevate a first portion of the mobile power plant trailer, a first level sensor configured to monitor a first attitude of the mobile power plant trailer at the first portion of the mobile power plant trailer, a second power tool configured to elevate a second portion of the mobile power plant trailer, and a second level sensor configured to monitor a second attitude of the mobile power plant trailer at the second portion of the mobile power plant trailer. The leveling system also includes a controller configured to receive data from the first level sensor and the second level sensor indicative of the first and second attitudes, respectively, and to adjust a first force applied by the first power tool, a second force applied by the second power tool, or both if the first attitude, the second attitude, or both deviates outside of a threshold attitude value.

In a third embodiment, a method of leveling a trailer of a mobile power plant includes applying, via a first torque wrench, a first torque to a first gear of a first trailer leg extending from the trailer, applying, via a second torque wrench, a second torque to a second gear of a second trailer leg extending from the trailer, monitoring, via a first level sensor, a first attitude of the trailer proximate to the first trailer leg, and monitoring, via a second level sensor, a second attitude of the trailer proximate to the second trailer leg. The method also includes determining and effectuating, via a controller, a first magnitude of the first torque and a second magnitude of the second torque, where the first magnitude is determined based on the first attitude and the second magnitude is determined based on the second attitude.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
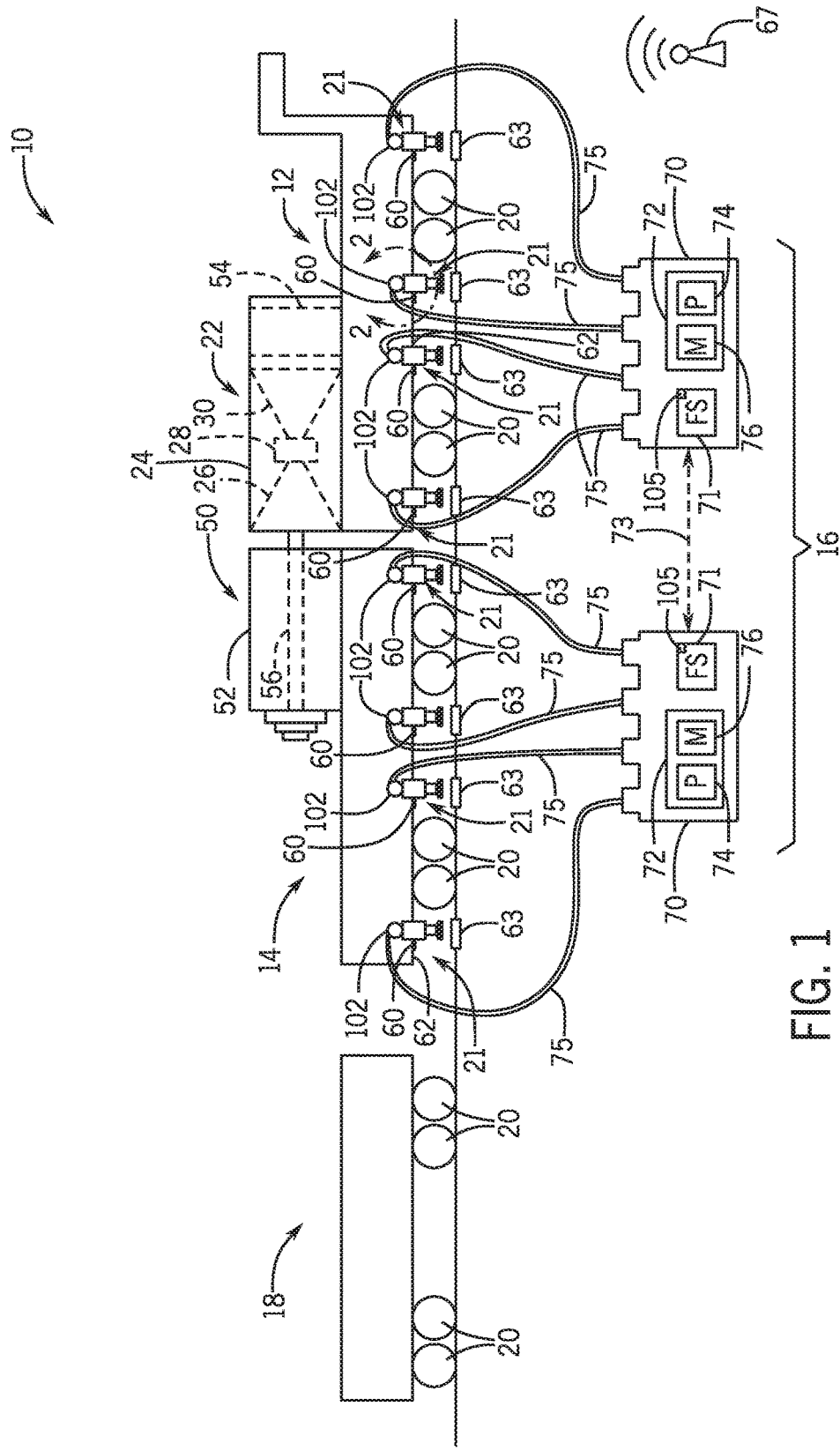
FIG. 1 is a block diagram of an embodiment of a mobile power plant system during an installation phase, having trailers and a trailer leveling system, in accordance with an aspect of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to systems and methods for installing and/or assembling a mobile (e.g., portable) power plant system at an installation site to meet power demands of customers (e.g., where permanent power plants may not be able to deliver power). More specifically, the disclosed embodiments are directed to leveling one or more trailers of the mobile power plant system. The mobile power plant may be a trailer mounted system that is transported by ship, air, road, or a combination thereof to the installation site. In some embodiments, the trailer mounted system may include several trailers having tires or wheels that enable the trailers to move long or short distances without being hauled by a separate vehicle.

Further, in some situations, the mobile power plant may be delivered to the installation site in a partially assembled state of components, with components mounted or disposed on one or more trailers (or other types of mobile bodies). The disclosed embodiments are directed to a mobile power plant system that may include a generator trailer, an engine trailer (e.g., an internal combustion engine trailer or a turbine trailer), and a transport trailer. The generator trailer may be configured to include a generator disposed thereon, and the engine trailer may be configured to include a turbine engine or an internal combustion (e.g., piston-cylinder) engine disposed thereon. For example, on a turbine trailer, the turbine engine may include a gas turbine engine, a steam turbine, a hydroturbine, a wind turbine, or any other suitable turbine system. The transport trailer may include certain components that, during a transportation phase, are maintained on the transport trailer, but during an installation phase, are moved to the generator trailer and/or the turbine trailer. For example, the transport trailer may include air and exhaust filtration systems, vent systems, exhaust stacks, and/or other components that may be moved to the generator trailer and/or the turbine trailer during the installation phase. Further, the transport trailer may include certain components that are not moved to the turbine trailer or generator trailer during the installation phase.

During the installation phase, one or more of the trailers may be elevated by an automated leveling system such that the trailers are leveled (e.g., such that points along the trailer are disposed at substantially equal heights off a flat [with respect to Earth's gravitational field] area of the ground, or such that a line intersecting the points along the trailer is substantially perpendicular to Earth's gravitational field). For example, one trailer may include 2, 3, 4, 5, 6, 7, 8, or more legs on each of two opposing sides of the trailer (e.g., opposing longitudinal sides of the trailer). A leveling system of the trailer may level the trailer, with respect to gravity, as the trailer is elevated. The leveling system may level the trailer across a length of the trailer, and across a width of the trailer, in accordance with the description below.

In certain embodiments, the leveling system may include a plurality of adjustable trailer legs distributed throughout the trailer, wherein each adjustable trailer leg may be coupled to a powered actuator or tool (e.g., torque wrench) either directly or indirectly through a gear assembly and/or transmission. The powered actuator may include a powered drive coupled to an actuator, wherein the powered drive may include an electric drive (e.g., electric motor), a fluid drive (e.g., a hydraulic drive and/or pneumatic drive), or a combination thereof. The actuator may include a linear actuator and/or a rotational actuator (e.g., torque actuator), and may include various gears, ratchets, and/or converters (e.g., rotational/linear converters) to transfer force from the powered drive through the actuator to a tool interface. The tool interface may then interface with the adjustable trailer leg on the trailer, e.g., a mating tool interface of the gear assembly or transmission. For example, the tool interface may include a torque tool interface.

In addition, the leveling system may include a monitoring system having a plurality of sensors (e.g., level sensors, angle sensors, force sensors, pressure sensors, torque sensors, speed sensors, etc.) coupled to and/or associated with the various adjustable trailer legs, powered actuators, gear assemblies or transmissions, and portions of the trailer (e.g., adjacent the adjustable trailer legs). The sensors provide feedback to a control system (e.g., electronic controller) coupled to the various powered drives, such that the control system can control the powered drives in a manner that gradually levels the trailer while lifting (and/or lowering) and stabilizing the trailer. For example, the control system may simultaneously control the rate or speed of each adjustable trailer leg of the plurality of adjustable legs via control of the powered drives (e.g., torque by each torque wrench). In certain embodiments, the control system may control two or more adjustable trailer legs to raise at a constant rate or a differential rate (e.g., one leg raising at a greater rate than another leg), and the control system may adjust the rate throughout the entire lifting (or lowering) and leveling process. In other words, based on the sensor feedback, the rate of lifting (or lowering) the various adjustable trailer legs may be variable at each individual leg, between pairs of opposite legs (e.g., opposite sides of the trailer), or between all of the legs. Likewise, the same process may be used to control the lowering of the trailer in a controlled manner. In this manner, the control system may be configured to substantially reduce, inhibit, or eliminate bowing, bending, or general stress on the trailer while driving the adjustable legs up and down during lifting and lowering of the trailer.

The following discussion presents the leveling system with hydraulics and torque wrenches as the powered actuators. However, it should be understood that the disclosed embodiments may employ any suitable power systems (e.g., fluid driven such as hydraulics or pneumatics, or electric driven), power lines (e.g., fluid or electric), and power actuators (e.g., torque wrenches). In certain embodiments, the leveling system may include 2, 3, 4, 5, 6, 7, 8, or more torque wrenches (e.g., torque ratchets), each torque wrench removably coupled to a corresponding gear system (or intervening adapter) of a corresponding one of the trailer legs. The torque wrenches may be powered torque wrenches (e.g., driven by electronic motors, hydraulic drives, etc.). The torque wrenches may include, or may be associated with, corresponding level sensors that monitor levels of the trailer at points proximate to the trailer legs. For example, the level sensors may be electronic levels, spirit levels, accelerometers, inclinometers, infrared sensors, limit sensors, proximity sensors, or other suitable level sensors. In some embodiments, the level sensors may detect angles (e.g., attitude, orientation) of the trailer with respect to Earth's gravitational field. Data from the level sensors may be sent to a controller (e.g., electronic controller with processor and memory), and the controller may determine whether each of the level sensors (or the portions of the trailer proximate to the level sensors) are level. If one or more of the level sensors indicates that portions of the trailer are not level (e.g., the portions of the trailer do not form substantially right angles with respect to Earth's gravitational field), the controller may adjust the leveling process in accordance with the description below.

The torque wrenches described above may be communicatively coupled with the controller that receives, from the torque wrenches and/or from the level sensors, data indicative of the levels or positions of the trailer legs. The controller may instruct each of the torque wrenches (e.g., by way of controlling a hydraulic pump, or otherwise controlling corresponding pressures or flows of hydraulic fluid) to apply an appropriate amount of torque to the corresponding gear systems of the corresponding trailer legs. For example, as suggested above, if the controller determines, based on the data received from the level sensors, that the trailer is not level at certain points along the trailer, the controller may adjust an amount of torque applied by certain ones of the torque wrenches to level the trailer. The controller may determine that the trailer is not level by analyzing the data received from individual level sensors, or by comparing the data received from all the level sensors. These and other features will be described in detail below with reference to later figures.

By ensuring that the trailer remains or becomes substantially level during and/or after the trailer's elevation, the leveling system may substantially reduce or eliminate any potential bowing of the trailer. Further, leveling of the trailer may cause enhanced performance of the components of the trailer (e.g., compared to the performance of the components on a trailer that is not properly leveled), and of the mobile power plant in general. Further still, using the automated leveling system reduces installation time and man power (e.g., over embodiments where the trailer is hand-cranked by operators working in conjunction to maintain the trailer's level). It should be noted, as suggested above and described in detail with reference to the figures, that the leveling system may elevate and ensure leveling of a particular trailer, or elevate and ensure leveling across multiple trailers. In other words, in accordance with certain embodiments, the leveling system may simultaneously elevate and level multiple trailers together (e.g., to facilitate leveling of the multiple trailers collectively during the installation phase). In accordance with other embodiments, the leveling system may only elevate and level a single of the trailers at a time.

Further, it should noted that the torque wrenches may be retrofit (e.g., via adapters) and/or removable from the gear assemblies of the trailer legs. Accordingly, as described in detail with reference to the figures, the torque wrenches and corresponding control system may be transported separately from the trailer, thereby overcoming certain trailer on-axle weight restrictions (e.g., maximum weight restrictions or requirements) that only apply during lateral movement of the trailer, where the requirements may otherwise be violated if the torque wrenches are permanently attached to the trailer legs. In some embodiments, however, permanent attachment of the torque wrenches to the trailer legs may be possible and desired without violating any trailer on-axle weight requirements.

Turning now to the drawings, FIG. 1 is a block diagram of an embodiment of a mobile power plant system 10 during a transportation phase. The illustrated mobile power plant system 10 includes a turbine trailer 12, a generator trailer 14, a trailer leveling control system 16 ("control system"), and a transport trailer 18. It should be noted that other types of trailers may additionally or alternatively be employed, and that the illustrated embodiment is merely an example of one configured for the mobile power plant system 10. In other words, the trailer leveling control system 16, in accordance with the present disclosure, may be utilized to level other types of trailers different from those in the illustrated mobile power plant system 10. Indeed, in some embodiments, the trailer leveling control system 16 may control and level trailers utilized for systems other than power plants such as the mobile power plant system 10 illustrated in FIG. 1. The mobile power plant system 10 of FIG. 1 is a non-limiting example system in which the trailer leveling control system 16 may be incorporated.

Continuing with the illustrated embodiment, a gas turbine engine 22 is disposed on the turbine trailer 12, and within an enclosure 24 mounted on or to the turbine trailer 12. In other embodiments, different types of turbine engines may be employed. For example, a steam turbine, a hydroturbine, a wind turbine, or any other suitable turbine engine may be utilized. The illustrated gas turbine engine 22 includes a single or multi-stage compressor 26, one or more combustors 28, and a single or multi-stage turbine 30. The compressor 26 may be configured to intake air or some other type of oxidant, compress the air or other type of oxidant, and supply the compressed air or other type of oxidant to the one or more combustors 28. The compressor 26 is driven (e.g., to facilitate compression of the air) by components of the gas turbine engine 22 described in detail below. For example, the compressor may include blades that, when rotated, compress the air or other type of oxidant as the air or other type of oxidant is passed to successively smaller cross-sectional areas of the compressor 26.

The combustor 28, which receives the compressed air or other type of oxidant from the compressor 26, also receives fuel (e.g., from a fuel source), and mixes the compressed oxidant with the fuel. The combustor 28 may then combust that oxidant-fuel mixture, generating combustion products that are received by the turbine 30. As the turbine 30 receives the combustion products, blades of the turbine 30 may be driven into rotation as the combustion products from the combustor 28 expand within the turbine 30. After the turbine 30 extracts work from the combustion products, the combustion products are exhausted from the turbine 30 as exhaust gas (e.g., through an exhaust stack 54). In some embodiments, the exhaust stack 54 may include a filtration system (e.g., scrubber) that cleans the exhaust gas prior to exhausting the exhaust gas (e.g., to atmosphere).

The blades of the turbine 30 may be coupled to a rotor (e.g., rotary component) of the turbine 30. The rotor of the turbine 30 may be coupled with a shaft 56 of the gas turbine engine 22, or may make up a part of the shaft 56. Accordingly, as the combustion products from the combustor 28 drive the blades and corresponding rotor of the turbine 30 into rotation, the rotor of the turbine 30 drives the shaft 56 of the gas turbine engine 22 into rotation.

As previously described, the compressor 26 of the gas turbine engine 22 is driven into rotation by one or more components of the gas turbine engine 22. More specifically, the compressor 26 (or rotary component thereof) may be driven into rotation by the shaft 56, or by another shaft of the gas turbine engine 22 coupled with the turbine 30. In other words, as the turbine 30 drives the shaft 56 into rotation, the shaft 56 may drive the compressor 26 into rotation, thereby causing the compressor 26 to compress air or some other type of oxidant for delivery to the combustor 28. The shaft 56 may also be coupled with a load 50, which may comprise a generator 52 (e.g., electrical generator). The load 50 (e.g., generator 52) may be powered by rotation of the shaft 56.

It should be noted that the load 50 may be any other suitable device that may generate power via the rotational output of the gas turbine engine 22. It should also be noted that several other components of the gas turbine engine 22 may not be shown in the illustrated embodiment. For example, the fuel delivered to the combustor 28 may use a fuel delivery system, fuel nozzles, and other components. The exhaust stack 54 may include an exhaust filtration system and/or a vent system. The compressor 26 may include an air inlet and an air filter configured to clean the air prior to the compressor 26 compressing the air. Further, it should be noted that some components of the gas turbine engine 22 and/or generator 50 may be disposed on the transport trailer 18 during the transportation phase, and moved to the generator trailer 14 and/or the turbine trailer 12 during the installation phase.

In accordance with present embodiments, the mobile power plant system 10 (or some other system having suitable trailers) may include the illustrated control system 16 configured to elevate and level the turbine trailer 12, the generator trailer 14, or a combination thereof. In some embodiments, the control system 16 may facilitate leveling of certain other trailers associated with the mobile power plant system 10 (e.g., the transport trailer 18 and/or other trailers not shown in the illustrated embodiment). As shown, the control system 16 may include two control modules 70, where one of the control modules 70 is associated with the turbine trailer 12 and the other of the control modules 70 is associated with the generator trailer 14. In the illustrated embodiment, the two control modules 70 may communicate with each other (e.g., via communication line 73). In other embodiments, the mobile power plant system 10 may include only one control module 70, where the only one control module 70 is configured to (a) control aspects of either the generator trailer 14 or the turbine trailer 12; or (b) control aspects of both the generator trailer 14 and the turbine trailer 12. In other words, in some embodiments, only one control module 70 may be suitable for leveling the generator trailer 14 and the turbine trailer 12, either collectively or individually.

Each of the control modules 70 in the illustrated embodiment includes a controller 72 having a processor 74 and a memory 76. The memory 76 may include instructions stored thereon that, when executed by the processor 74, cause the controller 72 to perform certain control functions. For example, as previously described, the control system 16 may control elevating (e.g., raising) and leveling of the turbine trailer 12 and/or the generator trailer 14. In other words, the control system 16 may control raising and lowering while maintaining attitude/orientation of the turbine trailer 12. The memory 76 may store instructions thereon related to analyzing and determining various characteristics associated with leveling the trailers 12, 14, and the processor 74 may be configured to execute said instructions to cause other components, as described in detail below, to level the trailers 12, 14.

For clarity, the following discussion will reference one of the control modules 70 and the turbine trailer 12 only. However, it should be understood that the second of the control modules 70 may control leveling of the generator trailer 14 in the same or a similar manner as the first of the control modules 70 controls leveling of the turbine trailer 12. Further, it should be understood that the first and second control modules 70 may work together to ensure that the generator trailer 14 is level with the turbine trailer 12. In other words, one or more control modules 70 may be utilized to level the turbine trailer 12, the generator trailer 14, and the turbine trailer 12 with respect to the generator trailer 14.

The turbine trailer 12 may include several wheels 20 that facilitate transportation of the turbine trailer 12. Further, the turbine trailer 12 may include several height-adjustable legs 21 that are extended (e.g., increased in height) during an installation phase, to cause the wheels 20 of the turbine trailer 12 to lift off the ground. Additionally or alternatively, the legs 21 may be retracted during a packing phase, to cause the wheels 20 of the turbine trailer 12 to lower to the ground. The turbine trailer 12 may include, for example, 2, 3, 4, 5, 6, 7, 8, or more of the legs 21 on each side (e.g., opposing pairs of legs 21) of the turbine trailer 12. Thus, the turbine trailer 12 may include 4, 6, 8, 10, 12, 14, 16, or more legs 21 in total.

A level sensor 60 may be disposed proximate to each of the legs 21. For example, the level sensors 60 may be electronic levels, spirit levels, inclinometers, accelerometers, infrared sensors, limit sensors, proximity sensors, or other suitable level sensors. The level sensors 60 may be disposed on a bottom surface 61 of the turbine trailer 12, or on any other suitable surface proximate to the corresponding leg 21. In general, the level sensors 60 may measure or detect a characteristic associated with a "level" of the turbine trailer 12 proximate to the corresponding leg 21 of the trailer 12. For example, the level sensors 60 may detect an attitude and/or orientation (e.g., pitch, yaw, and/or tilt angles) of the trailer 12 (e.g., with respect to Earth's gravitational field). A "leveled" portion of the trailer 12 may correspond with a 90 degree angle of the portion of the trailer 12 with respect to Earth's gravitational field. It should be noted, however, that the trailer 12 may be level along some portions of the trailers 12, but may not be level along other portions of the trailer 12. Accordingly, each of the legs 21 is independently adjustable based, for example, on data indicative of the attitude and orientation of the trailer 12 proximate to each of the legs 21 and corresponding level sensors 60.

Prior to leveling and elevating the trailer 12, contact plates 63 may be used to ensure that all the legs 21 have reached the ground prior to elevation of the trailer 12. In other words, in some embodiments, leveling and elevation of the trailer 12 may occur only after all the legs 21 are in contact with their corresponding contact plates 63. For example, the contact plates 63 may be disposed on the ground, and the legs 21 may extend toward, and contact, the contact plates 63, where the contact plates 63 (or the legs 21) include contact plate sensors. Initially, each of the legs 21 may be deployed until contacting the corresponding sensors of the contact plates 63. Once a particular leg 21 has contacted its corresponding contact plate 63, the controller 72 may stop the leg 21 from deploying until all the legs 21 have contacted the contact plates 63. Once all the legs 21 have reached the corresponding contact plates 63, the control system 16 may begin to level and then elevate the trailer 12 in accordance with the description below. The control module 70 may include a pre-set control phase in which the control module 70 lowers the legs 21 toward the contact plates 63. For example, the pre-set control phase may determine extension parameters of the legs 21 based only on when the legs 21 contact their corresponding contact plates 63. Accordingly, the pre-set control phase may not require, in certain embodiments, feedback from the level sensors 60. In accordance with the present disclosure, be ensuring that all the legs 21 are in contact with the contact plates 63 prior to leveling and elevating the trailer 12 (e.g., prior to loading the legs 21 of the trailer 12 with the weight of the trailer 12), an overload condition (e.g., on one or more of the legs 21) is blocked (or the likelihood of an overload condition is significantly reduced).

Each of the level sensors 60 may be communicatively coupled with the control module 70. For example, the level sensors 60 may be wirelessly coupled (e.g., via a wireless network 63) with the control module 70, or the level sensors 60 may be wired to the control module 70. The controller 72 of the control module 70 may analyze data received from the level sensors 60 and determine, based on said data, whether the turbine trailer 12 is level (e.g., with respect to Earth's gravitational field). If the turbine trailer 12 is not adequately level (e.g., within an error margin or a safety margin), the controller 72 may control various components to level the turbine trailer 12, as described in detail below. It should be noted that the controller 72 may control the legs 21 in real-time. In other words, the controller 72 may instruct various components, in accordance with the description below, to cause each of the legs 21 to extend or retract based on real-time feedback (e.g., from the level sensors 60), to ensure that the turbine trailer 12 does not bow. The controller 72 may control individual extension or retraction rates of each of the legs 21 based on a real-time disposition (e.g., attitude/orientation) of the turbine trailer 12 at the leg(s) 21 in question. It should be noted that, in some embodiments, the controller 72 may instruct various components to cause each of the legs 21 to extend or retract based on a target control phase or program. For example, the controller 72 may instruct components to cause the legs 21 to extend at a certain rate to enable final leveling of the turbine trailer 12 in a set amount of time. However, the following discussion focuses primarily on the real-time feedback features set forth above.

Each of the legs 21 of the turbine trailer 12 may include a corresponding tool 102 (e.g., torque wrench) coupled with the leg 21 (e.g., with a gear assembly of the leg 21, as described with reference to later figures). In some embodiments, adapters may be included between the tool 102 and the gear assembly of the leg 21 (e.g., to facilitate coupling of the tool 102 with a gear assembly that may have previously been manually cranked). The tool 102 may, for example, be a torque wrench or ratchet configured to exert a torque on the gear assembly, causing the leg 21 to expand. For example, the gear assembly may include an actuator that, when activated, pushes or expands (e.g., telescopes) a portion of the leg 21 out from within another portion of the leg 21. Each of the tools 102 may be coupled with a hose 75 that extends to the control module 70, where the control module 70 includes a fluid source 71 configured to provide fluid (e.g., hydraulic fluid, gas, air) to the tool 102. In other words, in accordance with the illustrated embodiment, the tool 102 may be a hydraulic torque wrench or a pneumatic torque wrench, although other torque wrenches (and tools, in general) are also employable. For example, depending on the embodiment, other types of tools 102 (e.g., electronic torque wrenches, impact torque wrenches, mechatronic torque wrenches, programmable electronic torque angle wrenches, or any other suitable torque wrench, linear actuating or driven tools, etc.) may be employed with suitable powered drives (e.g., electric drive or fluid drive). Further, depending on the embodiment, the fluid source 71 may be separate from the control module 70, but controlled directly or indirectly (e.g., via valves, pumps, etc.) by the controller 72.

The tool 102, the fluid source 71 (or electric drive), and/or intervening components (e.g., valves, pumps, etc.) may be controlled by the controller 72 to adjust an amount of torque supplied by each of the tools 102. For example, the controller 72 may control a pressure of the hydraulic fluid supplied to each of the torque wrenches (e.g., by way of controlling a pump 105 fluidly coupled between the fluid source 71 and the hose 75). Accordingly, if the controller 72 determines that the turbine trailer 12 is not level (e.g., along a particular portion of the trailer 12) in accordance with the description above, the controller 72 may adjust an amount of torque applied by certain of the tools 102 to their corresponding trailer legs 21, causing the turbine trailer 12 to become leveled (e.g., with respect to Earth's gravitational force). These and other features will be described in detail below with reference to later figures.

Figure 2:
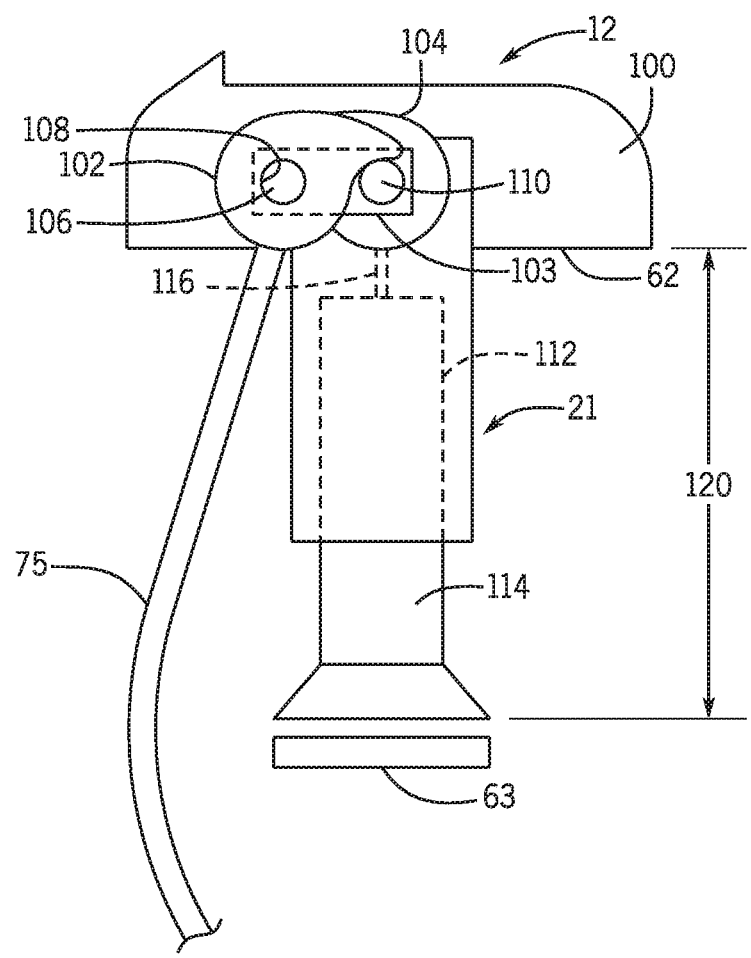
FIG. 2 is a schematic side view of an embodiment of a trailer leg, taken within line 2-2 in FIG. 1, extending from a side of a trailer of the mobile power plant system of FIG. 1, in accordance with an aspect of the present disclosure.

Turning now to FIG. 2, a schematic side view of an embodiment of one of the height-adjustable legs 21, taken long line 2-2 in FIG. 1, extending from a side 100 (e.g., surface) of the turbine trailer 12 of FIG. 1 is shown. In the illustrated embodiment, the tool 102 (e.g., hydraulic torque wrench) is coupled (e.g., removably coupled, temporarily coupled) with a gear assembly 104 of the leg 21. More specifically, an adapter 103 is disposed on the tool 102 or on the gear assembly 104 of the leg 21, where the adapter 103 facilitates coupling of the tool 102 and the gear assembly 104. The gear assembly 104 may include a rotatable bolt 106 to which the adapter 103 or the tool 102 is attached. The adapter 103 or the tool 102 may include an opening 108 configured to receive the bolt 106. The tool 102 may include gripping features proximate to (e.g., surrounding) the opening 108, where the gripping features rotatably grip the bolt 106. The gear assembly 104 or the adapter 103 may also include a stationary bolt 110 which the tool 102 contacts for leverage, although other mechanisms for leveraging the tool 102 may also be employed.

As previously described, the hose 75 in the illustrated embodiment may supply pressurized hydraulic fluid to the tool 102, where the tool 102 utilizes the pressurized hydraulic fluid to apply a torque to the rotatable bolt 106 of the height-adjustable leg 21. It should be noted that the hose 75 could be any control/power line, such as an electric or fluid line, depending on the type of powered drive employed. As the rotatable bolt 106 is turned by the tool 102, the gear assembly 104 of the leg 21 causes the leg 21 to change (e.g., increase) in height. For example, the leg 21 may include a stationary housing 112 (e.g., annular leg sleeve or support), a movable portion 114 (e.g., extendable/retractable cylindrical leg portion, protected by the housing 112), and an actuator 116 (shown schematically in the illustrated embodiment). The gear assembly 104, as the rotatable bolt 106 is turned by the tool 102, may engage the actuator 116, which causes the movable portion 114 of the leg 21 to move or telescope outwardly from the stationary housing 112 (e.g., causing the leg 21 to increase in height). In accordance with the present disclosure, a height 120 (e.g., effective height) of the leg 21 may be measured from the bottom surface 62 of the side 100 of the trailer 12. As the leg 21 expands and contacts (e.g., presses against) the ground (or the contact plate 63 disposed on the ground), the height 120 may be increased. It should be noted, in accordance with present embodiments, that other types of torque wrenches may also be employed (e.g., pneumatic torque wrenches, electronic torque wrenches, impact torque wrenches, mechatronic torque wrenches, programmable electronic torque angle wrenches, or any other suitable torque wrench), and that other types of actuators of the leg 21 (e.g., alternate to the illustrated gear assembly 104 and corresponding actuator 116) may also be employed.

Figure 3:
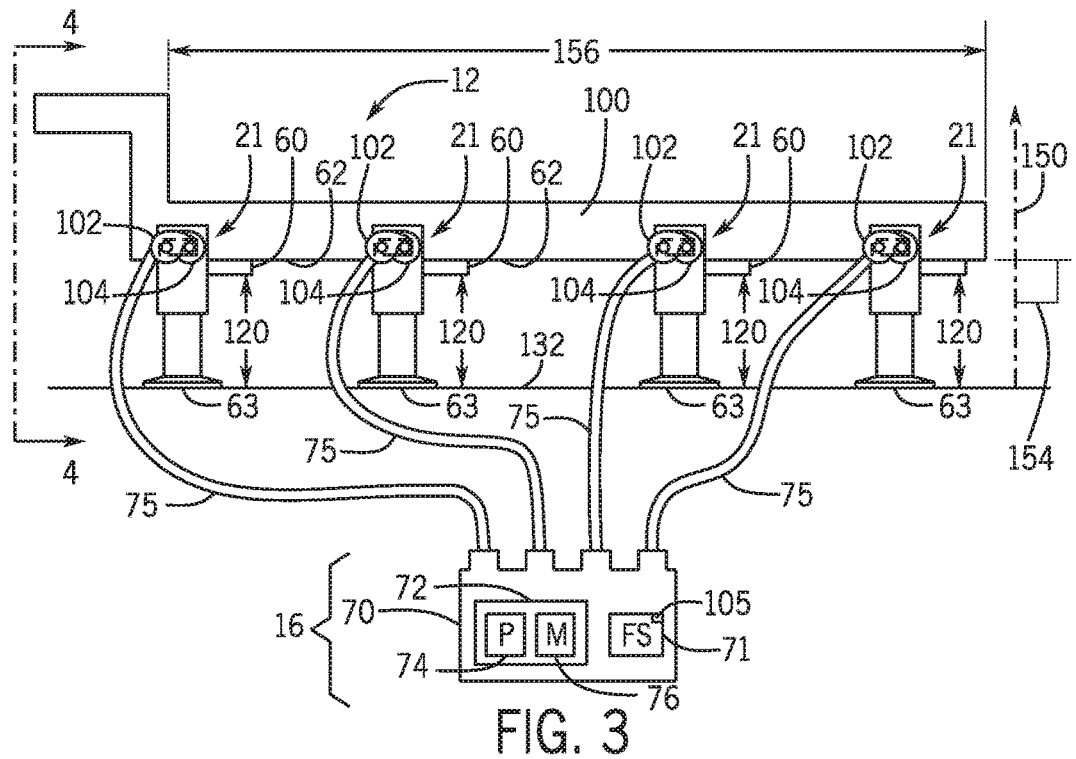
FIG. 3 is a schematic side view of an embodiment of one of the trailers and the trailer leveling system of FIG. 1, in accordance with an aspect of the present disclosure.
Figure 4:
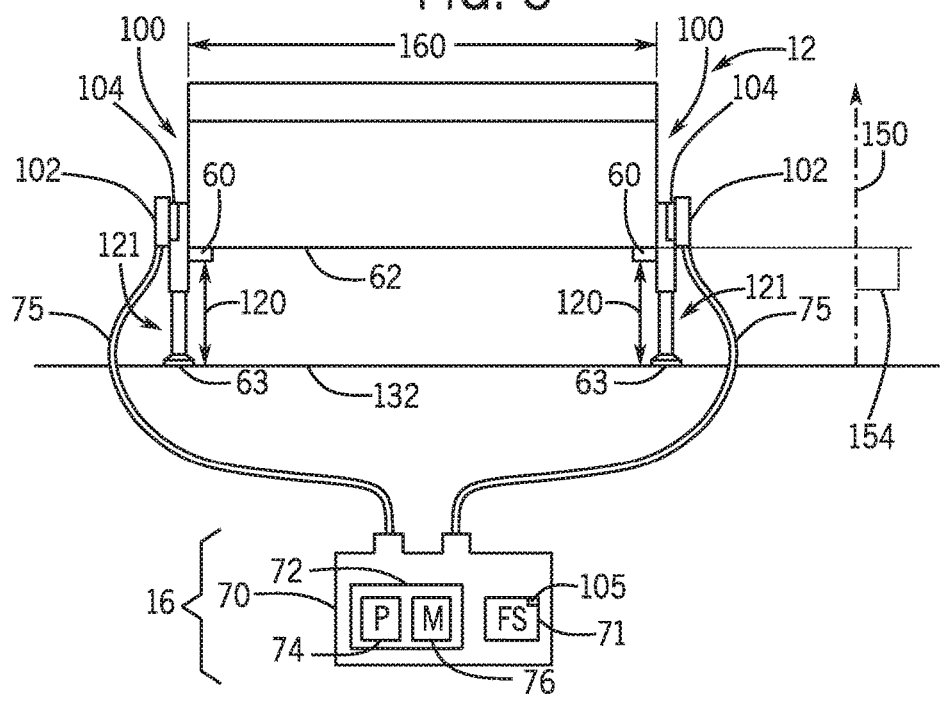
FIG. 4 is a schematic front view of an embodiment of the trailer and trailer leveling system of FIG. 3, taken along line 4-4 in FIG. 3, in accordance with an aspect of the present disclosure.

Turning now to FIG. 3, a schematic side view of an embodiment of the turbine trailer 12 and at least a portion of the control system 16 is shown. In FIG. 4, a schematic front view of an embodiment of the turbine trailer 12 of FIG. 3, taken along line 4-4, and at least the portion of the control system 16 is shown. In FIGS. 3 and 4, the turbine trailer 12 is illustrated in the leveled state off, for example, a flat ground 132 (e.g., with respect to Earth's gravitational force 150), although in other embodiments the ground 132 may not be flat. As shown in FIG. 3, the turbine trailer 12 is substantially perpendicular with gravity 150, as indicated by right angle 152, along a length 156 of the trailer 12. In FIG. 4, the turbine trailer 12 is substantially perpendicular with gravity 150, as indicated by right angle 155, along a width 160 of the trailer 12.

Figure 5:
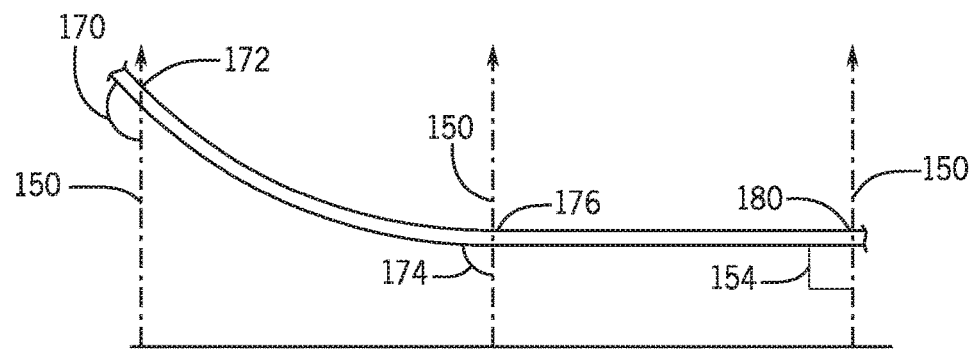
FIG. 5 is a schematic illustration of a side view of an embodiment of a skid of a trailer in an unleveled state, in accordance with an aspect of the present disclosure.
Figure 6:
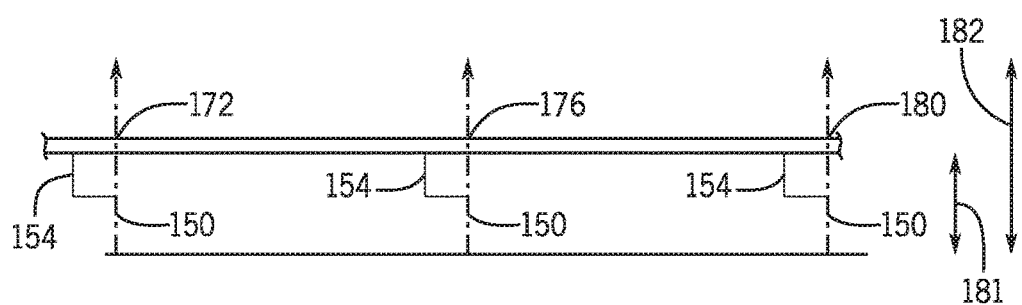
FIG. 6 is a schematic illustration of a side view of an embodiment of the skid of FIG. 5 in a leveled state, in accordance with an aspect of the present disclosure.

Assuming that the ground 132 illustrated in FIGS. 3 and 4 is substantially perpendicular with Earth's gravitational field 150 (although, as described above and below, the ground 132 may be angled), the heights 120 between the ground 132 and the bottom surface 62 of the turbine trailer 12 are substantially equal across the trailer 12. However, if the trailer 12 is not level (e.g., along the length 156 of the trailer 12 or along the width 160 of the trailer 12), the controller 72 may control aspects of the mobile power plant system 10 to work to level the trailer 12. For example, FIG. 5 includes a schematic illustration of the trailer 12 in an unleveled state. In the illustrated embodiment, the trailer 12 includes a first angle 170 (with respect to gravity 150) at a first point 172 on the trailer 12, and a second angle 174 (with respect to gravity 150) at a second point 176 on the trailer 12. The first angle 170 is larger than the second angle 174. Both the first angle 170 and the second angle 174 are larger than the right angle 154 (with respect to gravity 150) at a third point 178 on the trailer 12. With reference to the control aspects of the embodiments illustrated in FIGS. 3 and 4, the controller (e.g., controller 72) may analyze data received from sensors (e.g., level sensors 60) indicative of the angles 170, 174, 154, and may execute instructions to cause the first and second angles 170, 174 to become substantially equal with the right angle 154. For example, the controller (e.g., controller 72) may instruct torque wrenches (e.g., tools 102) proximate to the first and second points 172, 176 to exert less or no torque, while maintaining a higher torque exerted by a torque wrench proximate to the third point 180. In doing so, the controller 72 may cause the trailer 12 to become level (e.g., perpendicular with Earth's gravitational field 150), as shown in FIG. 6, such that the first and second angles 170, 174 become right angles 154. It should be noted, in accordance with the description above and below, that "less" and "more" are relative terms, and that "less" may encompass zero. In other words, applying "less" torque, in some embodiments, may include applying no torque at all.

It should be noted, with respect to the discussion of FIGS. 1-6 set forth above, that perfectly leveling the trailer 12 may be difficult and/or impractical. Accordingly, in some embodiments, the control system may aim to ensure not that the trailer 12 is perfectly level, but that the trailer 12 does not exceed a threshold attitude (e.g., angle) with respect to Earth's gravitational field. For example, if the trailer being perfectly level requires that it extend at a right angle (e.g., 90 degree angle) with respect to Earth's gravitational field 150, the threshold attitude (e.g., angle) value may be 90+/−0.1 degrees, 90+/−0.3 degrees, 90+/−0.5 degrees, 90+/−1 degree, 90+/−3 degrees, or 90+/−5 degrees. These and other features will be described in detail below with reference to a process flow diagram. It should also be noted that each position sensor 60 may detect more than one angle of the trailer 12. For example, the position sensor 60 may detect a pitch, a yaw, and/or a tilt of the trailer 12. If the trailer 12 is uneven with respect to a width of the trailer 12, the leveling system may instruct differences in torque applied to legs 21 on opposing sides of the trailer 12. If the trailer 12 is uneven with respect to a length of the trailer 12, the leveling system may instruct differences in torque applied to legs 21 on the same side of the trailer 12.

After leveling of the trailer 12, the trailer 12 may be lifted to include a clearance off the ground. For example, FIG. 6 includes an illustration of the trailer 12 in the leveled state. In the illustrated embodiment, the trailer 12 includes a first clearance 181 between the trailer 12 and the ground. However, the trailer 12 may be further elevated to include a second clearance 182 between the trailer 12 and the ground, where the second clearance 182 is greater than the first clearance 181. By elevating the trailer 12 after leveling the trailer 12 (e.g., to include the second clearance 182), components disposed on the trailer 12 are removed from close proximity to the ground, thereby reducing the likelihood that contaminants (e.g., dirt) on the ground impact the components (e.g., an air intake unit) disposed on the trailer 12.

Figure 7:
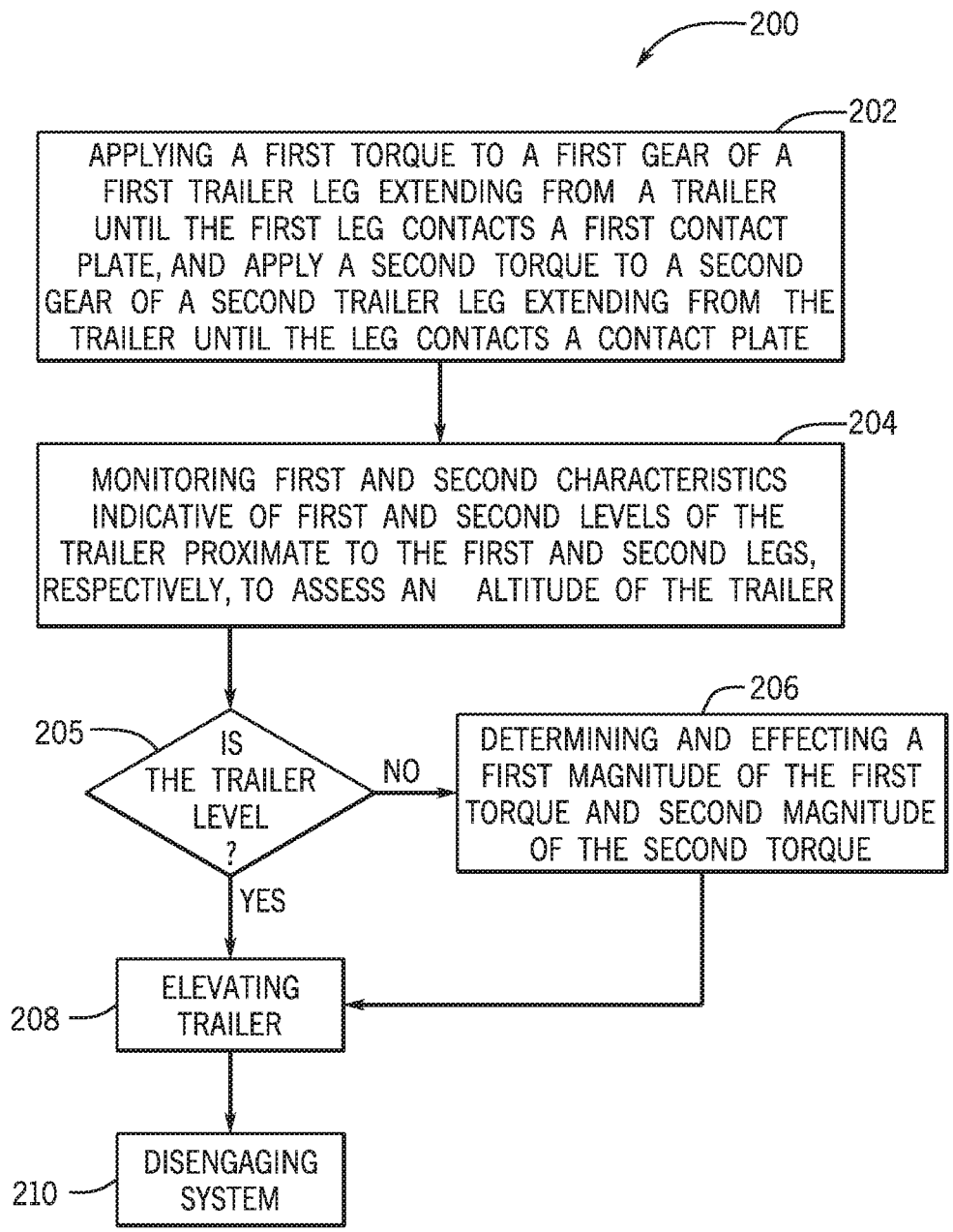
FIG. 7 is a process flow diagram illustrating a method of leveling a trailer of a mobile power plant system, in accordance with an aspect of the present disclosure.

FIG. 7 is a process flow diagram illustrating an embodiment of a method 200 of leveling one or more trailers of a mobile power plant system. The method 200 includes applying (block 202), via a first torque wrench and a second torque wrench, first and second torques to first and second trailer legs, respectively, extending from the trailer. For example, in the illustrated embodiment, the first torque is applied to the first gear of the first trailer leg until the first trailer leg contacts a first contact plate. Once the first trailer leg contacts the first contact plate, extension of the first trailer leg may be stopped until the second trailer leg contacts the second contact plate. Indeed, the second torque is applied to the second gear of the second trailer leg until the second trailer leg contacts a second contact plate. By ensuring that the first and second legs contact the first and second contact plates prior to leveling and/or elevating the trailer, an overload condition on one or more of the trailer legs is blocked (or a likelihood thereof is significantly reduced).

As previously described, the first and second torque wrenches (which apply the first and second torques, respectively) may be hydraulic torque wrenches coupled with gear assemblies (or intervening adapters) of the first and second trailer legs. As the first and second torque wrenches exert first and second torques against the gear assemblies or adapters (or bolts thereof) of the first and second legs, the first and second legs may expand in height. In some embodiments, the first torque, for example, may be applied until the first leg contacts a first contact plate disposed on the ground. The first torque may then be stopped until the second torque causes the second leg to contact a second contact plate disposed on the ground. Once all the legs have contacted their corresponding contact plates, the control system may again instruct the torque wrenches to torque their corresponding gear assemblies in order to level the trailer, as described below.

The method 200 also includes monitoring (block 204), via first and second sensors, first and second characteristics indicative of first and second levels of the trailer proximate to the first and second trailer legs, respectively (e.g., to assess an attitude of the trailer). For example, as previously described, the first and second sensors may include level sensors. The first and second sensors may detect attitude/orientation (e.g., yaw, pitch, tilt) of the trailer (with respect to gravity) proximate to the first and second sensors (e.g., where the first and second sensors are disposed proximate to the first and second legs of the trailer).

The method 200 also includes determining whether the trailer is level (block 205). For example as previously described, the control module may receive data indicative of the attitude of the trailer from the level sensors. If the trailer is not level, the control module may determine and effectuate (block 206), via a controller of the control module and based on the first and second levels of the trailer, a first magnitude of the first torque and/or a second magnitude of the second torque, where the second magnitude is different than the first magnitude. For example, the controller may receive data indicative of first and second levels of the trailer. The controller may determine, based on the received data, desired first and second magnitudes of the first and second torques in order to stabilize or level the trailer. For example, the controller may instruct that the first torque wrench to exert a first magnitude that is smaller than a second magnitude exerted by the second torque wrench, in order to extend the first leg more quickly than the second leg (e.g., to level the trailer across the first and second legs). Of course, the trailer may include any number of legs, and the leveling of the trailer may involve leveling across all the legs. Thus, the first and second magnitudes may be determined by taking into account data indicative of levels of all the trailer legs (or of more than just the first and second trailer legs). Further, it should be noted that, in some embodiments, the controller may instruct that the first magnitude be "0" until the second torque wrench causes the second leg of the trailer to catch up, thereby leveling the trailer between the first and second legs.

After block 206, or if the trailer is already in the level state following the determination in block 205, the trailer may be elevated (block 208). For example, once the trailer is level, the trailer may be elevated across the trailer legs at an equal rate. In this way, a clearance is generated between the ground and the bottom of the trailer, thereby reducing a likelihood that contaminants (e.g., dirt) impact components (e.g., an air intake unit) disposed on or about the trailer. The method 200 also includes disengaging (block 210) the system after leveling and elevating the trailer.

In accordance with present embodiments, the trailer leveling system may reduce an installation time of the trailer. Further, the trailer leveling system may more accurately level the trailer. Further still, the trailer leveling system may reduce a man power required to level the trailer. As previously described, the trailer leveling system may level a single trailer, or the trailer leveling system may level two or more trailers simultaneously.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A mobile power plant system, comprising:
a trailer comprising a first leg extending from the trailer and having a first gear assembly, a second leg extending from the trailer and having a second gear assembly, one or more turbine components positioned on the trailer; and
a leveling system having a first power tool coupled with the first gear assembly, a second power tool coupled with the second gear assembly, a first level sensor configured to measure or detect a first level characteristic of the turbine trailer and corresponding with the first power tool, a second level sensor configured to measure or detect a second level characteristic of the turbine trailer and corresponding with the second power tool, and a controller communicatively coupled with the first level sensor and the second level sensor;
wherein the controller receives data, from the first level sensor, indicative of the first level characteristic comprising a first attitude of the trailer proximate to the first leg, wherein the controller receives data, from the second level sensor, indicative of the second level characteristic comprising a second attitude of the trailer proximate to the second leg, wherein the controller monitors the first attitude and the second attitude, and wherein the controller is configured to effectuate, based on the first attitude and the second attitude, a first force applied by the first power tool and a second force applied by the second power tool different in magnitude than the first force.

2. The system of claim 1, wherein the first power tool and the second power tool are first and second torque wrenches, and wherein the first force and the second force are first and second torques.

3. The system of claim 2, wherein the first and second torque wrenches are first and second hydraulic torque wrenches, wherein the leveling assembly comprises a hydraulic fluid source and at least one hydraulic pump fluidly coupled with the hydraulic fluid source, wherein the controller is communicatively coupled with the at least one hydraulic pump, and wherein the controller is configured to control the at least one hydraulic pump to enable control of the first torque applied by the first hydraulic torque wrench, the second torque applied by the second hydraulic torque wrench, or both based on the first attitude, the second attitude, or both.

4. The system of claim 3, comprising a first hose coupled between the at least one hydraulic pump and the first hydraulic torque wrench, and a second hose coupled between the at least one hydraulic pump and the second hydraulic torque wrench, wherein the first hose is configured to deliver the hydraulic fluid to the first hydraulic torque wrench at a first pressure corresponding with the first torque, and wherein the second hose is configured to deliver the hydraulic fluid to the second hydraulic torque wrench at a second pressure corresponding with the second torque.

5. The system of claim 1, wherein the first attitude and the second attitude correspond with a pitch, a yaw, or a tilt.

6. The system of claim 1, wherein the first leg is disposed on a first side of the trailer, and the second leg is disposed on a second side of the trailer opposite to the first side of the trailer.

7. The system of claim 1, wherein the first leg and the second leg are disposed on a first side of the trailer.

8. The system of claim 1, wherein the trailer comprises ten legs extending from the trailer including the first and second legs, wherein the trailer comprises ten gear assemblies corresponding and coupled with the ten legs and including the first and second gear assemblies, wherein the leveling assembly comprises ten power tools corresponding and coupled with the ten gear assemblies and including the first and second power tools, and wherein the leveling assembly comprises ten level sensors corresponding with the ten power tools and including the first and second level sensors.

9. The system of claim 1, wherein the first power tool and the second power tool are pneumatic torque wrenches.

10. The system of claim 1, comprising a first adapter disposed between the first power tool and the first gear assembly, and a second adapter disposed between the second power tool and the second gear assembly.

11. A leveling system of a mobile power plant trailer, comprising:
   a first power tool configured to elevate a first portion of the mobile power plant trailer;
   a first level sensor configured to monitor or detect a first level characteristic of the mobile power plant trailer, the first level characteristic comprising a first attitude of the mobile power plant trailer at the first portion of the mobile power plant trailer;
   a second power tool configured to elevate a second portion of the mobile power plant trailer;
   a second level sensor configured to monitor or detect a second level characteristic of the mobile power plant trailer, the second level characteristic comprising a second attitude of the mobile power plant trailer at the second portion of the mobile power plant trailer; and
   a controller configured to receive data from the first level sensor and the second level sensor indicative of the first and second attitudes, respectively, and to effectuate, based on the first attitude and the second attitude, a first force applied by the first power tool and a second force applied by the second power tool different in magnitude than the first force.

12. The leveling system of claim 11, wherein the threshold attitude value comprises 90+/−3 degrees with respect to Earth's gravitational field.

13. The leveling system of claim 11, comprising:
   a first adapter configured to enable coupling of the first power tool with, and removal of the first power tool from, a first leg of the mobile power plant trailer at the first portion of the mobile power plant trailer; and
   a second adapter configured to enable coupling of the second power tool with, and removal of the second power tool from, a second leg of the mobile power plant trailer at the second portion of the mobile power plant trailer.

14. The leveling system of claim 11, wherein the first power tool and the second power tool are first and second hydraulic torque wrenches, wherein the first force is a first torque and the second force is a second torque, wherein the leveling system comprises a hydraulic fluid source and at least one hydraulic pump fluidly coupled with the hydraulic fluid source, wherein the controller is communicatively coupled with the at least one hydraulic pump, and wherein the controller is configured to control the at least one hydraulic pump to enable control of the first torque applied by the first hydraulic torque wrench and the second torque applied by the second hydraulic torque wrench.

15. The system of claim 14, comprising:
   a first hose coupled between the at least one hydraulic pump and the first hydraulic torque wrench; and
   a second hose coupled between the at least one hydraulic pump and the second hydraulic torque wrench, wherein the first hose is configured to deliver the hydraulic fluid to the first hydraulic torque wrench at a first pressure corresponding with the first torque, and wherein the second hose is configured to deliver the hydraulic fluid to the second hydraulic torque wrench at a second pressure corresponding with the second torque.

16. A method of leveling a trailer comprising:
   applying, via a first torque wrench, a first torque to a first gear of a first trailer leg extending from the trailer;
   applying, via a second torque wrench, a second torque to a second gear of a second trailer leg extending from the trailer;
   monitoring, via a first level sensor configured to monitor or detect a first level characteristic of the trailer, the first level characteristic comprising a first attitude of the trailer proximate to the first trailer leg;
   monitoring, via a second level sensor configured to monitor or detect a second level characteristic of the trailer, the second level characteristic comprising a second attitude of the trailer proximate to the second trailer leg; and
   determining and effectuating, via a controller, a first magnitude of the first torque and a second magnitude of the second torque, wherein the first magnitude is determined based on the first attitude and the second magnitude is determined based on the second attitude, and wherein the first magnitude is different than the second magnitude.

17. The method of claim 16, wherein the first trailer leg is disposed on a first side of the trailer and the second trailer leg is disposed on a second side of the trailer opposite to the first side, such that a width of the trailer between the first and second sides of the trailer is substantially leveled.

18. The method of claim 16, wherein the first trailer leg is disposed on a first side of the trailer and the second trailer leg is disposed on the first side of the trailer, such that a length of the trailer along the first side of the trailer is substantially leveled.

19. The method of claim 16, comprising deploying the first trailer leg until the first trailer leg contacts a first contact plate, and then stopping the first trailer leg from deploying until the second trailer leg contacts a second contact plate.

20. The method of claim 16, comprising stopping the first trailer leg from deploying if the first attitude deviates from a threshold attitude value.

* * * * *